(12) United States Patent
John et al.

(10) Patent No.: US 6,241,508 B1
(45) Date of Patent: Jun. 5, 2001

(54) MULTIPLE MOLD WORKSTATION WITH SINGLE INJECTION FEEDER AND HYDRAULIC PUMPING STATION

(75) Inventors: Michael John, Dallas, TX (US); Robert Daigle, Pompano Beach, FL (US)

(73) Assignee: Plastic Pallet Production, Inc., Norman, OK (US)

( * ) Notice: Subject to any disclaimer, the term of this patent is extended or adjusted under 35 U.S.C. 154(b) by 0 days.

(21) Appl. No.: 09/346,165

(22) Filed: Jul. 1, 1999

Related U.S. Application Data

(63) Continuation-in-part of application No. 08/879,107, filed on Jun. 19, 1997, now abandoned.

(51) Int. Cl.[7] ............................ B29C 45/10; B29C 45/67; B29C 45/76
(52) U.S. Cl. ............................ 425/559; 425/572; 425/588; 425/589; 425/593; 425/451.7; 425/451.9
(58) Field of Search .................................... 425/557, 559, 425/572, 589, 593, 450.1, 451.7, 451.9, 588

(56) References Cited

U.S. PATENT DOCUMENTS

| | | | |
|---|---|---|---|
| 4,242,073 | * 12/1980 | Tsuchiya et al. | 425/558 |
| 4,390,332 | * 6/1983 | Hendry | 425/4 R |
| 5,052,909 | * 10/1991 | Hertzer et al. | 425/150 |
| 5,542,465 | * 8/1996 | Wolniak | 164/341 |
| 5,643,620 | * 7/1997 | Brun, Jr. | 425/556 |
| 5,928,596 | * 7/1999 | McLeod et al. | 264/297.2 |

* cited by examiner

Primary Examiner—David A. Simmons
Assistant Examiner—Robert A. Hopkins
(74) Attorney, Agent, or Firm—Bill D. McCarthy; Crowe & Dunlevy

(57) ABSTRACT

Disclosed is a high pressure injection molding system employing one or more plastic injection molding workstations including split molds, a single plastic extruder coupled to a heated manifold capable of delivering fluid plastic to multiple workstations, and wherein final lockup of the split mold halves results in application of compressive forces effective to maintain the split mold halves in nominal position during high pressure injection molding conditions. Operational movement is performed by use of a single remote pumping station utilizing pressure compensated pumps, accumulators and manifolds. The independent mold workstations allow independent operation while providing efficency of operation for the hydraulic system and extruder system.

8 Claims, 6 Drawing Sheets

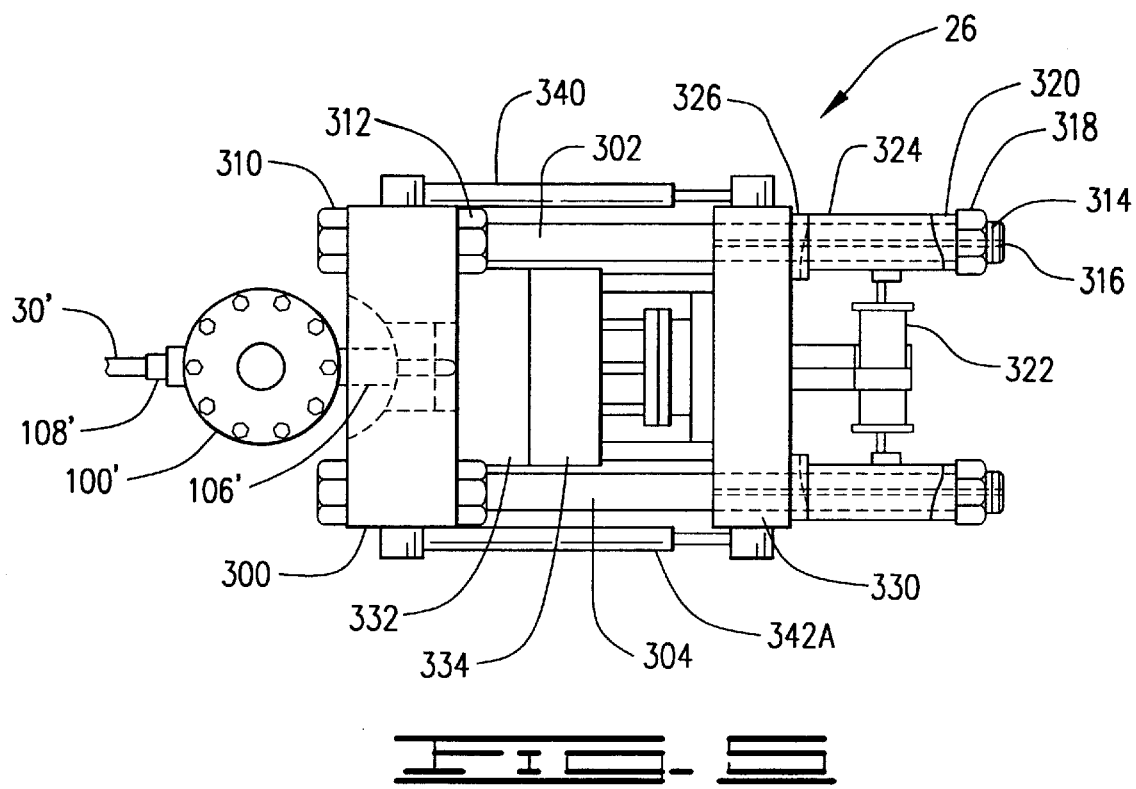
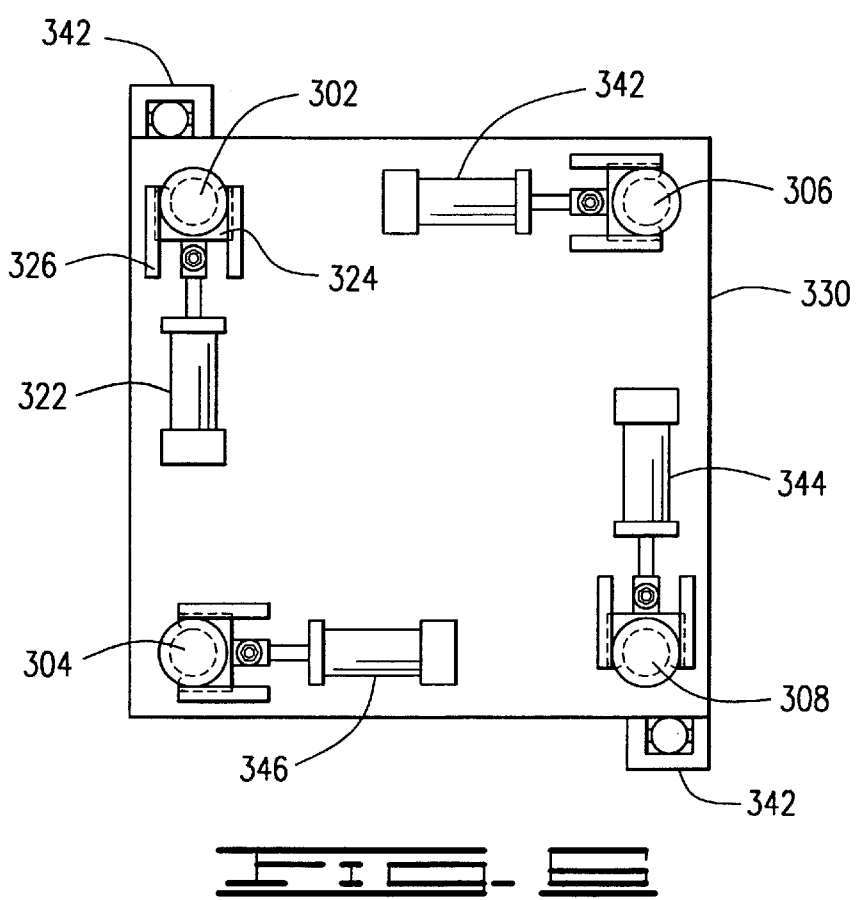

MULTIPLE MOLD WORKSTATION WITH SINGLE INJECTION FEEDER AND HYDRAULIC PUMPING STATION

CROSS REFERENCE TO RELATED APPLICATIONS

This application is a continuation-in-part of U.S. Ser. No. 08/879,107, filed Jun. 19, 1997, abandoned, the contents of which is herein incorporated by reference.

FIELD OF THE INVENTION

This invention is related to the field of plastic molding, particularly to a high pressure injection molding machine which requires no externally applied clamping pressure, and additionally to a multiple mold workstation module comprising a single extrusion machine and hydraulic pumping station coupled to individual mold workstations each having an independent injection unit and mold clamp.

BACKGROUND OF THE INVENTION

High pressure injection molding devices, e.g. those devices operating at injection pressures of greater than 1000 psi, are well-known in the art for their use in producing plastic components. In a conventional injection molding machine, a mold sized for the machine must be properly positioned in order to receive plastic through a high temperature/pressure injection process. In this manner, the mold is placed within the machine by first opening a mold clamp section wherein the mold can be mounted to a front platen of the machine. This mounting is usually performed by the use of clamps bolted to some, of the many, threaded holes in the platen. The back half of the clamp section must also be set, which is a complicated adjustment, for the clamp section must be firm but not too tight if proper plastic flow is expected. Knock-out bars, referred to as ejectors, must also be adjusted for ejection of the finished parts. The ejectors are positioned for proper length of travel to eject the finished parts. It is critical that the ejectors do not over travel, or mold damage will occur. When the adjustment is complete, the clamp section is closed to secure the back half of the mold to the rear platen, again typically with clamps. The mold may then be cycled open and closed to permit ejector and clamp pressure adjustment. Upon positioning of the movable portion of the mold to its mating position with the stationary mold half, sufficient clamping pressure must be externally applied and maintained during high pressure injection to prevent flashing of molten plastic from the mold interface, and to prevent warpage during the cool-down and shrinkage phase, prior to ejection of the parts. Maintenance of the required clamping pressure is normally maintained by applying sufficient external force, e.g. via the use of a hydraulically powered ram, so as to oppose the internal pressures developed within the mold cavity during injection. Mold speed is set to occur within a cycle specified.

Heater zones must be turned on, usually three to six, depending on the machine size. Temperatures must be set according to the plastic material being used wherein variations run from 300 degrees Fahrenheit to 700 degrees Fahrenheit. If the temperature is too hot, the plastic will burn, and if it is too cold, damage to the machine will likely occur. The controllers on the machine regulate and maintain set temperatures within a very close range at a very considerable cost. While a machine is heated up, water lines on the mold are installed and tested for leaks.

Once all heat zones are stabilized, the injection unit is retracted from the mold area and materials added to the hopper. Molten plastic is then extruded from the nozzle to remove contaminated plastic that was used previously in the machine. This can be time consuming and materially wasteful, the amount of wasted material varies dependent upon the specific type of plastic and color of plastic selected. For example, if the machine previously had black color, and the new material is clear, it is not uncommon to use up to 100 pounds of plastic prior to making the first acceptable molding.

In operation, a shot size is determined and set, usually by moving limit switches located on the rear of the injection unit. Too much plastic will make the mold flash open, and too little will cause ejection problems. Estimates can be problematic, owing to the discrepancies caused by other variables such as pressure, temperature of the plastic, and back pressure. If the weight of the part to be formed is known, air shots can be made and weighed, otherwise the operation is guesswork. Once the settings are made manually, the machine timers must be set for a semi-automatic or automatic cycle. This requires trial and error but in either event, a trained set-up man can still spend several hours getting a machine on cycle, making acceptable parts, and still the operator can change any number of controls in seconds to make inferior parts that are not immediately identified.

The above complications are multiplied when additional molds are used. For instance, if ten molding machines are employed, the above set-up must be repeated ten times. In addition, when one mold machine is being set-up or serviced, the plastic is allowed to stagnate, if not cool, causing the malfunction of the plastic feeder and/or injector system. This non-operation can cause problems in and of itself.

What is lacking in the art is a compact high pressure injection molding device of simplified design, which maintains nominal pressure upon the mold cavity, prior to and during high pressure injection molding, while eliminating the need for additional means for generating and/or maintaining externally applied clamping pressure forces, e.g. hydraulic rams and the like; and wherein all process functions are commonly controlled from a single source.

SUMMARY OF THE INVENTION

The instant invention teaches a single or multi-mold high pressure injection molding device including a single extrusion machine and a single hydraulic system coupled to one or more independent mold workstations. Each mold workstation consists of an injection means including a resin accumulator for receipt of a particular volume of molten softened plastic, and which employs a source of hydraulic pressure to increase the pressure of the transferred softened plastic derived from the extrusion machine for subsequent high pressure injection into the workstation mold, which is of a split mold design. The injection units are coupled to the extrusion machine by a heated manifold having heated coupling lines. The hydraulic system provides fluid to each workstation via a single pumping station preset to a given pressure and controlled by variable displacement pumps and hydraulic accumulators.

The resin accumulator which supplies molten plastic to the injection unit employs a hydraulically driven piston having a step-down reduction chamber to increase the injection pressure of the molten plastic. The injection unit provides for high pressure passage of the plastic which allows the plastic to be transferred at lower temperatures. The injection unit has thermocouples to monitor the plastic temperature and a nozzle shut-off to regulate plastic flow. A series of heated check valves prevent the back-flow of plastic through the injection unit, manifold and extrusion machine.

Each mold workstation includes a split mold positioned between two plates, one movable and one stationary, which are mechanically linked via cylindrical tiebars. In a particular embodiment, a moving plate having half of the mold coupled to it, is in slidable engagement with the tiebars and is mechanically coupled to one or more relatively small hydraulic cylinders for effecting opening and closing of the mold. Upon initial closing, one or more piston actuators secured to the rear side surface of the moving plate operate slidable wedge shaped securement devices which are forced between reciprocally angled wear plates located on the rear side surface of the moving plate and the distal end of the tiebars, to provide final lockup. The slidable wedge shaped securement devices are particularly designed so as to partially encircle the tiebars when in the final lockup position, so as to provide over-center positioning of the wedge shaped securement device with respect to the longitudinal axis of the tiebar. The tiebars each have a threaded portion and a keyway allowing an adjustment nut to position the slidable wedges into an appropriate spatial locking position, while preventing rotation of said wedges about the tiebar. Movement of the securement devices causes the moving plate to lock against the fixed plate, whereby compressive forces are generated upon the mold halves, in an amount effective to maintain said mold halves within nominal position, during high pressure injection molding conditions, so as to prevent flashing from the mold, and without incurring warpage as the plastic cools. The necessary compressive forces for maintaining this nominal positioning of the mold halves, under high pressure injection molding conditions, derives from appropriately sizing the tiebars, such that the length, thickness and type of steel result in an elastic modulus which maintains the stretch or creep of the tiebar within a range effective to insure successful molding conditions. The adjustment nut further allows the use of various sized molds and accommodates ongoing wear of the wear plates.

In a second embodiment, a moving plate having half of the mold coupled to it is operated by a hydraulic piston coupled to an over-center hinge member. The hinge member maintains the mold in a closed position by positioning the hinge arms in a parallel, or near parallel position. The piston provides a high pressure actuator to maintain the mold in a fixed position. Mold separation is made possible by movement of the hinge arms.

The mold workstation further employs ejectors that protrude into the forming chamber when the mold is opened. The ejectors cause the finished product to be expelled from the mold and can be either operated by a hydraulic piston, or operated in the form of ejector fingers that extend through the mold when the mold is opened.

The initial cost, and operating costs, of a multi-mold workstation "module" becomes a fraction of the cost of multiple free operating adjustable machines. One extrusion machine can supply molted plastic to multiple injection units, e.g. ten or more, by use of a heated manifold whereby an economy of scale is achieved. Each injection unit employs a hydraulic actuated piston having a step down chamber reduction to increase the plastic pressure. The injection unit is cycled to accept a preset amount of plastic through the manifold system. The piston is then actuated to force the plastic at a high pressure into the mold. The injection unit has thermocouples to monitor the plastic temperature and a nozzle shut-off to regulate plastic flow. A series of heated check valves prevents the back-flow of plastic through the injection unit, manifold and extrusion machine.

Controls for the multi-mold workstation are centrally located allowing operation of each injector unit and mold machine from a single location. However, since the individual workstations utilize valves that perform all of the various functions, a plug-in connector could be in series with the wiring allowing the mold set-up person to plug in a portable control box and manually run any function prior to switching on automatic control.

The single extruder minimizes energy costs, as only two to three motors run constantly at independent load versus 20 to 60 motors on conventional machines of the same size. In addition, one raw material feeder, versus e.g. 10 raw material feeders, reduces spillage of pellets and lessens the chance of contaminating the material.

Accordingly it is an objective of the instant invention to teach an improved high pressure injection molding machine having a unique mold locking assembly which eliminates the necessity for application of clamping pressure during high pressure injection.

It is another objective of the invention to reduce the controls of a mold machine by 80 to 90 percent over typical production machines. The lack of adjustable controls decreases cost and increases reliability of operation.

Still a further objective of the invention is to teach a system wherein the power requirements are reduced by more than half of typical production machines.

Yet another objective of the invention is to teach the reduction of the workstation size and footprint so as to be less than half that of a typical production machine.

Yet a further objective of the instant invention is to provide the quality and product repeatability heretofore only obtainable in a single injection unit in a multi-mold system.

An additional objective of the invention is to teach the use of a mold workstation having slidable securement locks that are adjustable to the size of a mold and to accommodate wear.

Still an additional objective is to reduce the noise levels of a mold system by providing a system wherein motors and pumps are remote and reduced in size.

Additionally, a further objective is to reduce localized wiring to low voltage and eliminate high voltage motors at the individual workstations for increasing personnel safety.

Still another objective is to provide a single hydraulic system to feed multiple workstations which eliminates the need for multiple oil reservoirs thereby reducing costs, accidental spills, leaks and floor space.

Further still, an objective of the instant invention is to teach the use of a single extrusion machine for coupling to multiple mold workstations by use of a heated manifold system.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 5 is a top plane view of a mold machine having a preferred clamp design in a closed position;

FIG. 6 is a rear plane view of a mold machine having the preferred clamp design;

FIG. 9 is a pictorial view of a particular embodiment of a continuous extrusion injection molding system.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
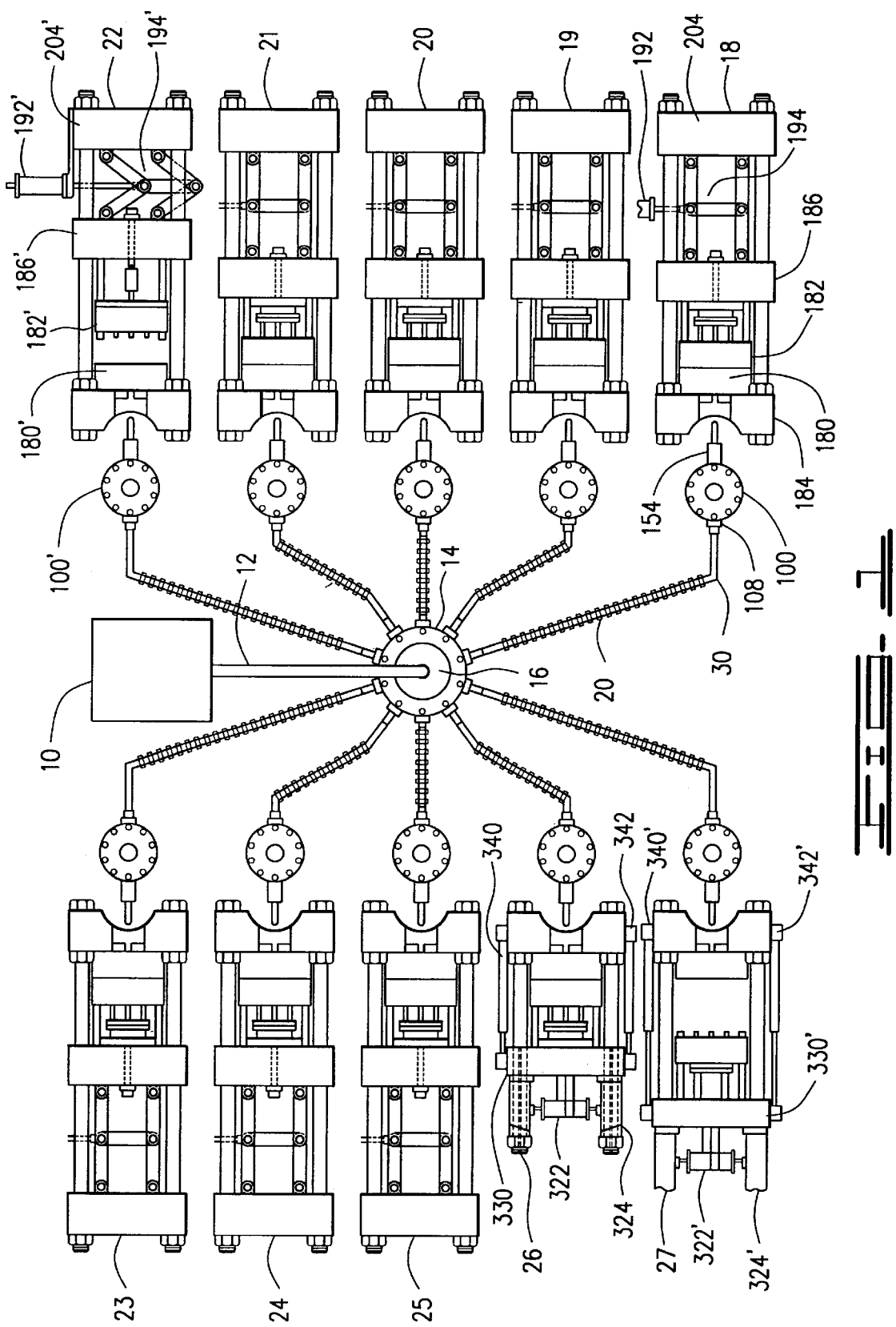
FIG. 1 is a pictorial view of the multi-mold workstation with single extrusion machine and manifold of the instant invention.

Referring now to FIG. 1, set forth is a pictorial of the multiple mold workstation module of the instant invention. The module employs an extrusion unit 10 for use in feeding softened plastic through pipe 12 into a heated distribution manifold 14. The heated distribution manifold 14 includes a collating hub 16 that allows for the even distribution of softened plastic to multiple mold workstations as depicted by numerals 18–27. The illustrated and preferred quantity of mold workstations being between two and ten workstations with individual injection units forming the workstation module.

The distribution manifold 14 carries the plastic to the mold workstations through coupling pipe 30 having heater bands 20 positioned along the length of the pipe 30 for maintaining the plastic in a softened state during transfer. The coupling pipe 30 is secured to injector unit 100, described in detail later in this specification, with directional flow check valve 108 to prohibit back flow of plastic into the manifold 14. A valve 154 provides a shut-off between the mold workstation 184 and the manifold 14 and further allows for injection unit 100 detachment should the system require servicing. The removal of the mold workstation 18 does not inhibit operation of the extrusion machine 10 or injector unit 100 on other workstations.

For purposes of drawing clarity, the remaining coupling pipes are illustrated, but not numerated. Each coupling pipe operates in the above captioned manner to transfer softened plastic to the individual injector units and attached mold workstations.

Mold workstation 18 depicts one embodiment of the clamping mechanism. In this illustration the injection unit 100 provides for a pressurized flow of plastic into mold workstation 18. Mold sections are forced together by piston 192 which operates in conjunction with hinge members 194 to securely lock the plate mold in a closed position upon placement of the hinge members in a parallel plane forming a direct wedge between a rear plate 204 and the mold support plate 186. The locking arrangement permits the mold 180 and 182 to receive the pressurized plastic.

Mold workstation 22 depicts the clamp mechanism in an open position. In this illustration the injection unit 100' again provides for a pressurized flow of plastic into the mold workstation 22. Mold sections are forced open by piston 192 which operates in conjunction with hinge members 194 to open the plate mold upon placement of the hinge members in a non-parallel plane to eliminate the wedge between rear plate 204 and the mold support plate 186. The open arrangement permits access to contents of molds 180 and 182.

Mold workstation 26, FIGS. 1 and 5 depict the preferred embodiment of the clamping mechanism in a closed position for receipt of pressurized plastic. In this illustration the injection unit provides for a pressurized flow of plastic into mold workstation 26. Mold sections are forced together by illustrated piston 322 which operates in conjunction with wedge shaped securement device 324 to securely lock the mold in a closed position by forming a direct wedge between rear plate 330 and the end of the tiebars. Cylinders 340 and 342 are used to position the mold in a closed position before the wedge shaped securement devices lock the mold.

Mold workstation 27 depicts the preferred embodiment of the clamping mechanism in an open position for removal of a completed component. Mold sections are unlocked by the retraction of illustrated piston 322' which operates in conjunction with wedge shaped securement device 324' to securely lock the mold in a closed position. Cylinders 340' and 342' are then used to place the mold in an open position.

Figure 2:
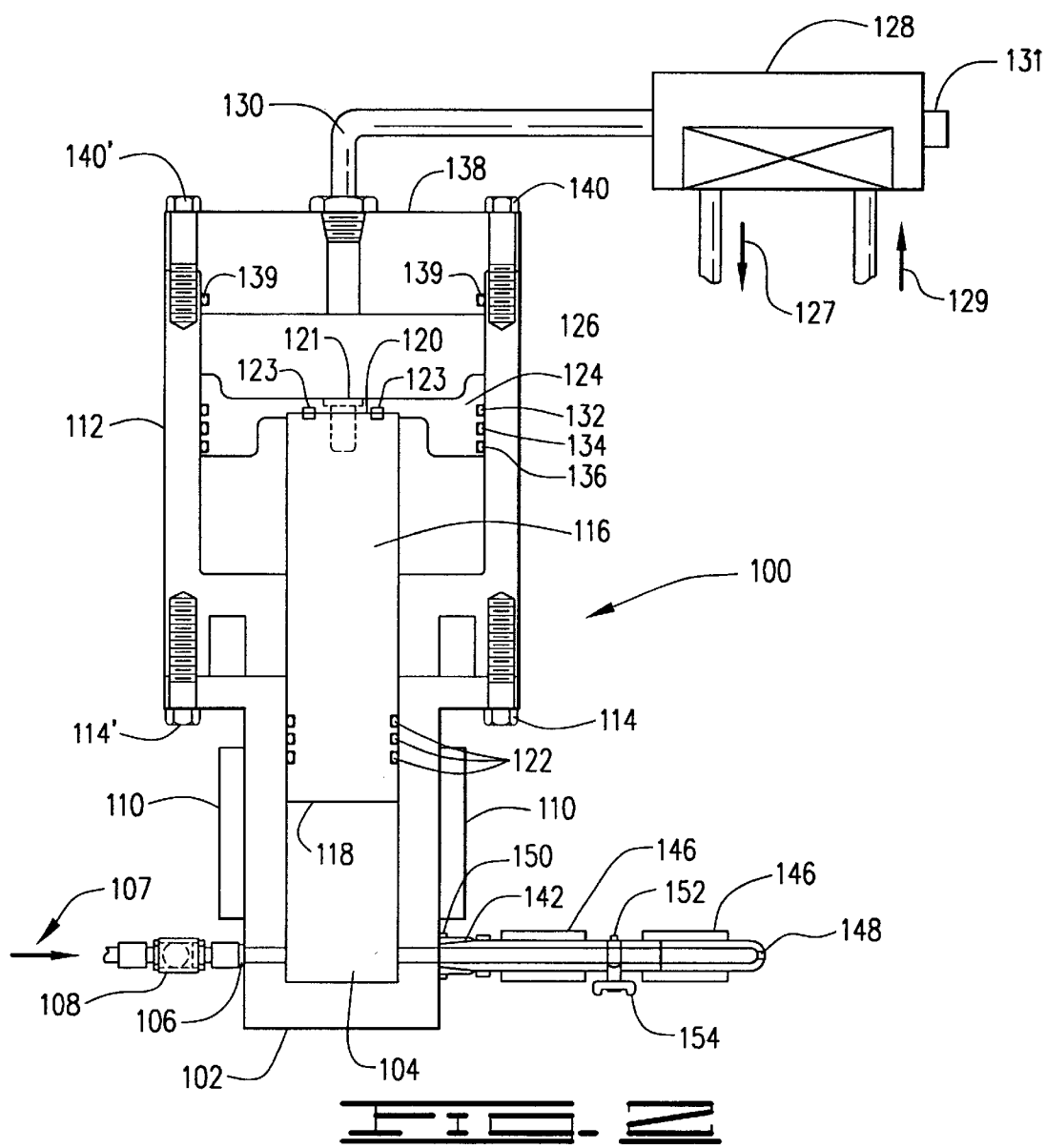
FIG. 2 is a cross sectional view of the injector unit.

FIG. 2 depicts the injection unit 100 having a lower housing 102 forming chamber 104. Softened plastic from the extrusion machine is fed through the manifold and into the coupling lines 30 for placement into chamber 104. Check valve 108 prohibits the back flow of plastic into the manifold.

The lower housing 102 is secured to upper housing 112 by mounting bolts 114. The upper housing 112 contains a plastic driving piston 116 having a distal end 118 for engaging the plastic within chamber 104 that enters in the direction of arrow 107. The piston 116 has sealing rings 122 to prevent bypass around the piston.

The piston is part of a step up pressure multiplier. In this manner, piston 116 is preferably constructed of 4130 steel hardened to RC 45–55 with an outer diameter surface ground and polished for minimal fluid bypass. The piston 116 has a diameter of approximately 6 inches and provides an area of 28.27 square inches. The upper end 120 of piston 116 is coupled to a 10 inch diameter cylinder 124, having an area of 78.54 square inches, and is secured to the piston 116 by mounting bolt 121. The cylinder 124 is sealed to the piston by use of seal 123.

Hydraulic fluid for operation of the piston is controlled by a solenoid valve 128 having a pressurized inlet 129 for delivery of fluid at discharge pressure through coupling pipe 130 and an outlet 127 for return of fluid to a reservoir 400. The solenoid has an actuator 131 to control the speed of fluid and pressure delivered through the solenoid. The hydraulic fluid is inserted in the space 126 above cylinder 124 at a pressure of 2000 psi providing a force of 157,080 lbs, thus, the resulting force on the plastic within the chamber is 5,556 psi. The cylinder 124 employs steel rings 132 and 134 with a Teflon ring 136 positioned beneath the steel rings for sealing of the fluid. End cap 138 is bolted 140 to the upper housing allowing for ease of maintenance to the cylinder 124 and piston 116. End cap 138 is sealed by o-ring seal 139 placed around the outer diameter of the end cap 138 with the bolts 140 holding the end cap securely in position.

In operation, plastic is inserted through inlet 106 which forces the piston 116 upward allowing the chamber 104 to be filled with a predetermined amount of plastic. The band heaters 146 and heated injection unit 110 maintain the plastic in a softened state. Upon demand, the plastic is delivered through outlet 142 into the workstation mold. The coupling pipe includes band heaters 146 for maintaining of the plastic in a softened state for placement through nozzle opening 148. Thermocouple 150 and 152 verify plastic temperature and control shut off valve 154 to prevent plastic flow if necessary.

Figure 2A:
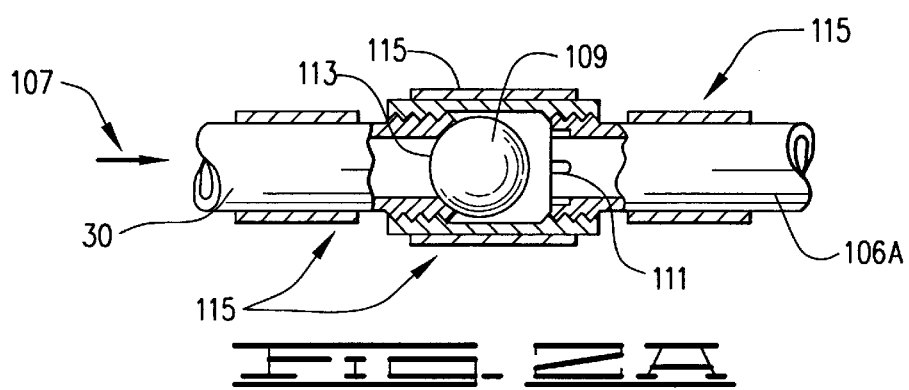
FIG. 2A is an enlarged cross sectional view of a heated check valve.

FIG. 2A sets forth a cross sectional side view of the check valve 108. Seat 111 includes spacial openings to allow the flow of plastic during the filling process, at low pressure. However, the ball 109 engages seal 113 during a back flow position to prevent the return flow of plastic. The mass of high pressure plastic is capable of displacing the ball 109 to form the seal to prevent the backflow condition. If a backflow condition exists, such as when the chamber is pressurized, the ball 109 is pushed against seal 113 to prevent plastic from escaping the chamber. Band heaters 115 are located around the check valve to maintain the plastic in a fluid state. It is noted that the check valve depicted is used through the module for control of plastic flow where needed.

Figure 3:
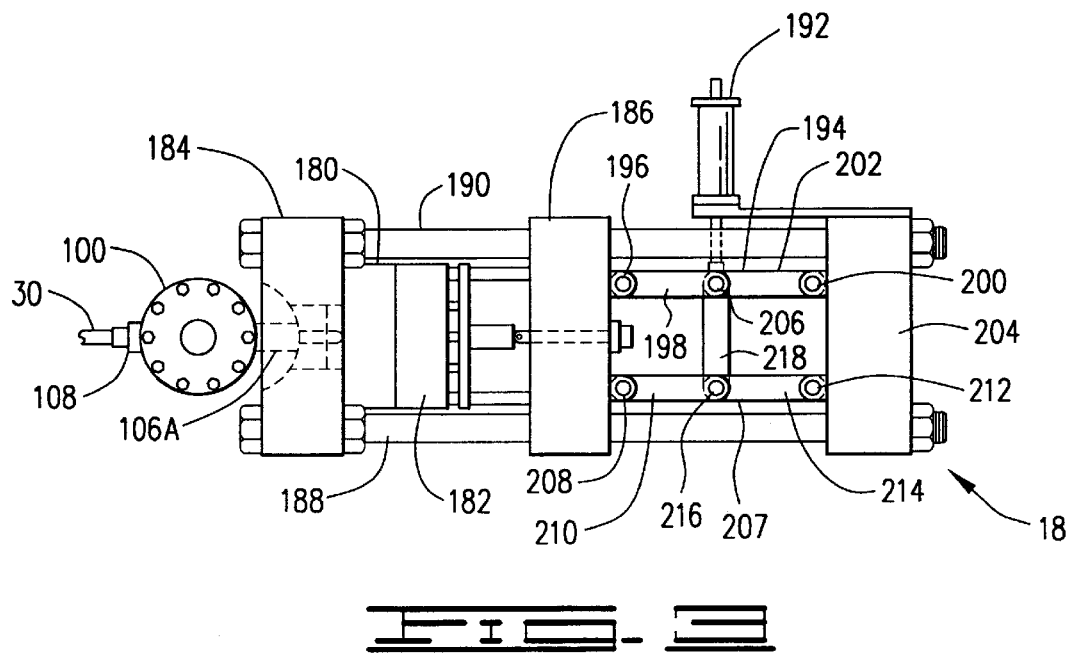
FIG. 3 is a top plane view of a mold machine having an alternative clamp design in a closed position.

FIG. 3 depicts the mold workstation 18 coupled to the manifold injection unit 100 by coupling pipe 106A. The injection unit 100 provides the high pressure flow of plastic into the mold workstation 18; having a split mold defined by first section 180 securable to fixed plate 184 and a second section 182 movably securable to plate 186. The plates and molds are maintained in alignment by tiebars as depicted by numerals 188 and 190. It is noted that the tiebars form the super structure for support of the plates and molds.

The means for moving plate 186, and second section of spit mold, also referred to as mold 182, into a position for accepting plastic injection is performed by use of piston actuator 192 which operates in conjunction with hinge members to lock the plate 186 in a fixed position. A first hinge 194 consists of hinge arm 198 having a proximal end 196 secured to the first plate 186 and hinge arm 202 having a proximal end 200 coupled to end plate 204 with each said hinge arms having a proximal end coupled together and secured to the piston actuator 192 at pinion point 206. A second hinge member 207 has a distal end 208 of a first hinge arm 210 secured to the first plate 186 and a distal end 212 of a second hinge arm 214 secured to end plate 204 with said first 210 and second 214 hinge arms having a proximal end coupled together and secured to the piston actuator 192 by tying bracket 218. The spaced apart positioning of the proximal ends places the hinge members in a parallel position to maintain the mold in a closed position. In this position, the mold is ready to accept the injection of plastic from the injection unit 100.

Figure 4:
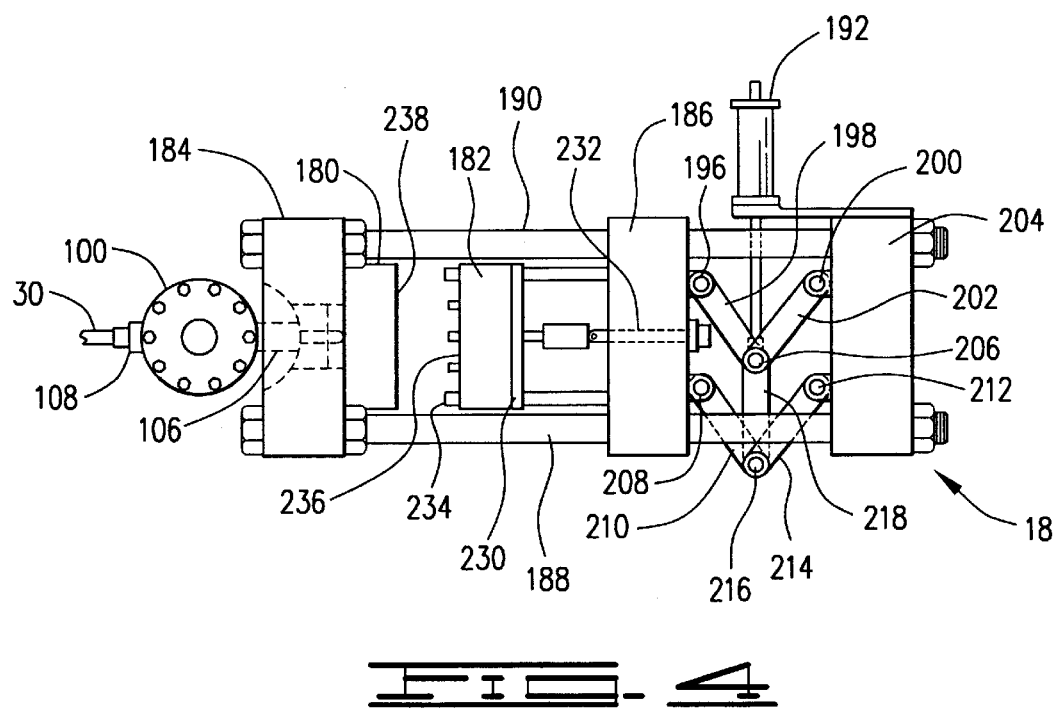
FIG. 4 is a top plane view of a mold machine in an open position.

FIG. 4 depicts the mold workstation 18 in an opened position. the mold workstation is again manipulated by a first section 180 secured to fixed plate 184 and a second section 182 securable to plate 186. In this manner the first hinge member is dislocated wherein the first hinge arm 198 and second hinge arm 202 are moved which causes an over center hinge coupling thereby moving the plate 186 toward end plate 204. The second hinge member employing hinge arm 210 and 214 to provide uniform movement of plate 186.

The second portion 182 of the split mold has a plurality of apertures allowing for the protrusion of ejectors 234 through surface 236 for expelling of the molded piece of plastic when the molds are separated. The ejectors can be secured to bracket 230 causing protrusion of the ejectors upon retraction of plate 186, preferably the ejectors are coupled to a hydraulic piston 232 to allow for movement of the ejectors as needed.

Referring to FIG. 4, the mold workstation 18 is shown coupled to the manifold injection unit 100 by coupling pipe 106A. The injection unit 100 provides the high pressure flow of plastic into the mold workstation 18; having a split mold defined by first section 180 securable to fixed plate 184 and a second section 182 movably securable to plate 186. The plates and molds are maintained in alignment by tiebars as depicted by numerals 188 and 190. It is noted that tiebars form the super structure for support of the plates and molds.

The means for moving plate 186, and mold 182, into a position for accepting plastic injection is performed by use of piston actuator 192 which operates in conjunction with hinge members to lock the plate 186 in a fixed position. A first hinge 194 consists of hinge arm 198 having a proximal end 196 secured to the first plate 186 and hinge arm 202 having a proximal end 200 coupled to end plate 204 with each said hinge arms having a proximal end coupled together and secured to the piston actuator 192 at pinion point 206. A second hinge member 207 has a distal end 208 of a first hinge arm 210 secured to the first plate 186 and a distal end 212 of a second hinge arm 214 secured to end plate 204 with said first 210 and second 214 hinge arms having a proximal end coupled together and secured to the piston actuator 192 by tying bracket 218. The spaced apart positioning of the proximal ends place the hinge members in a parallel position to maintain the mold in a closed position. In this position, the mold is ready to accept the injection of plastic from the injection unit 100.

Now referring in general to FIGS. 5 and 6, set forth is the preferred embodiment of the mold workstation depicted by numeral 26. The mold workstation 26 is coupled to the injector unit 100' by coupling pipe 106A'. As with the previously described alternative embodiment of the mold workstation, the injection unit 100' is coupled to the heated manifold by pipe 30' with backflow prevented by use of check valve 108'.

In the preferred embodiment, the mold workstation 26 consists of a fixed support plate 300 having tiebars 302, 304, 306, and 308. The tiebars are secured to support plate 300 by use of a coupling nut 310 located on a first side surface of the support plate 300 and a second coupling nut 312 located on the opposite side surface of the support plate 300. Each shaft, as depicted by shaft 302, includes a threaded end portion 314 having a key slot 316 which allows for directional receipt of slotted wear washer 318 held in position by adjustable securement nut 320. Unique to this embodiment is the use of four piston actuators, as illustrated in FIG. 6. Each actuator, as depicted by numeral 322, is coupled to a slidable wedge shaped securement device 324 for use in spacial spreading the distance between wear washer 318 and wear plate 326.

The slidable wedge shaped securement device includes an angle shape and is operatively associated with wear plate 326 to maintain an engagement alignment when not used for said spacial spreading. Preferably the wedge shaped securement device 324 is approximately twelve inches in length which allows sufficient room for removal of finished products and allows for servicing of the molds. In operation, the wedge shaped securement device 324 causes the first portion of split mold 332 to lock against the second portion of split mold 334 thereby allowing for receipt of the highly pressurized plastic from injection unit 100'. The mold plate 330 is securely locked in position upon the positioning of the wedge members 324 between the wear plate and wear washer. Upon retraction of the wedge member, the mold plate 330 may be opened by pistons 340 and 342A used to provide a spatial distance between support plate 300 and movable mold plate 330 allowing access to the mold chamber. The wear plate 326 is replaceable and formed at a reciprocal angle to the angled wedge shaped securement device 324. Each angle increasing the spacial separation to create a positive seal between the mold sections. Securement nut 320 is used to accommodate for wear of the plate 326 or washer 318 as well as allow for various size molds to be placed within the mold workstation. The threaded nut may also be used to accommodate various size molds.

FIG. 6 depicts an end view of the preferred mold workstation embodiment having the piston actuators shown engaging the tiebar shafts. As previously described, movable plate 330 is first positioned by use of cylinders 340 and 342. The wedge-shaped securement devices are retracted from engagement with the alignment shafts to allow an opening of the mold of approximately twelve inches. It will be obvious to one skilled in the art that the size of the wedge shaped securement device may be altered as well as that of the spatial wear washers without defeating the intent of this invention. Piston actuator 322 is shown engaging shaft 302. Similarly, piston actuator 342 engages shaft 306, piston 344 actuator is used for engaging shaft 308, and piston actuator 346 is used for engaging shaft 304. The wear plate 326 includes a lip for maintaining the wedge shaped securement device 324 in alignment while in a retracted position.

Figure 7:
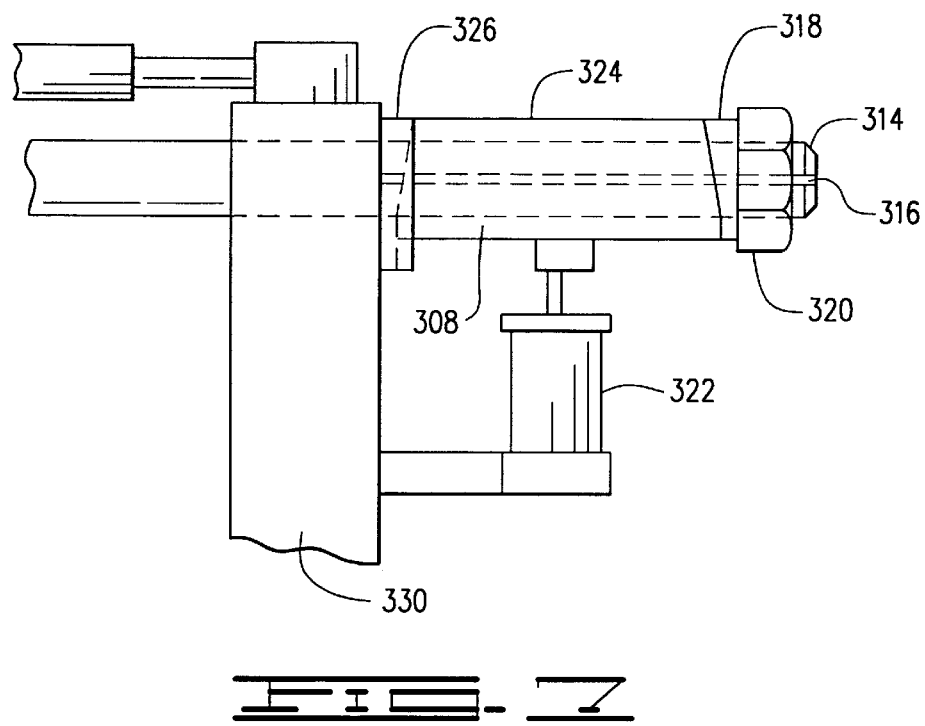
FIG. 7 is a partial side view of a mold machine having the piston actuated wedge clamp.

Referring now to FIG. 7, shown in an enlarged side view of the movable mold plate 330 having piston actuator 322 inserting wedge shaped securement device 324 between the wear plate 326 and wear washer 318 juxtapositioned to the securement nut 320. The wear washer includes a tab, not shown, operatively associated with key way 316 for use in preventing rotation of the wear washer during engagement. A portion of the shaft 314 is threaded allowing for use of various size molds as well as to accommodate excessive wear of the wear plate and wear washer.

Figure 8:
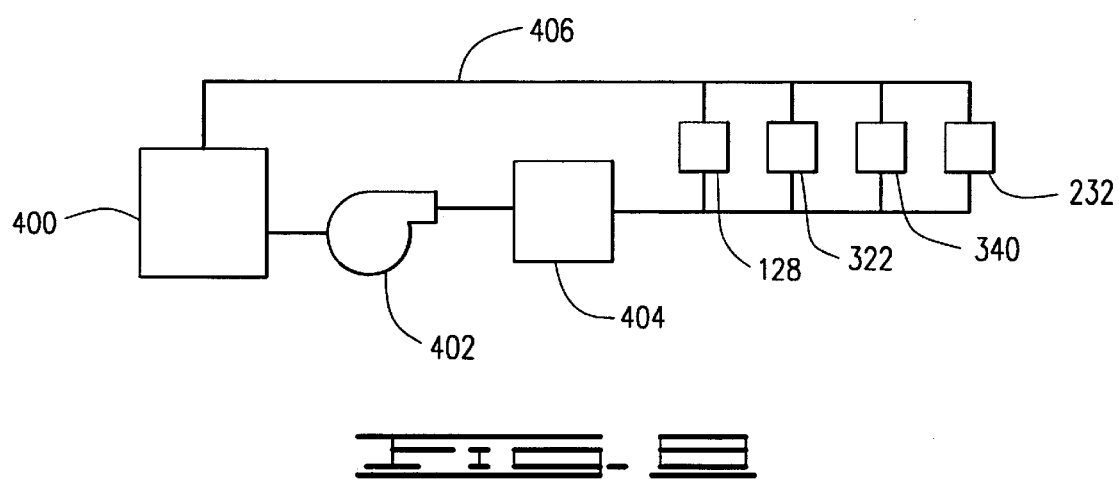
FIG. 8 is a flow diagram of the hydraulic system.
Figure 11:
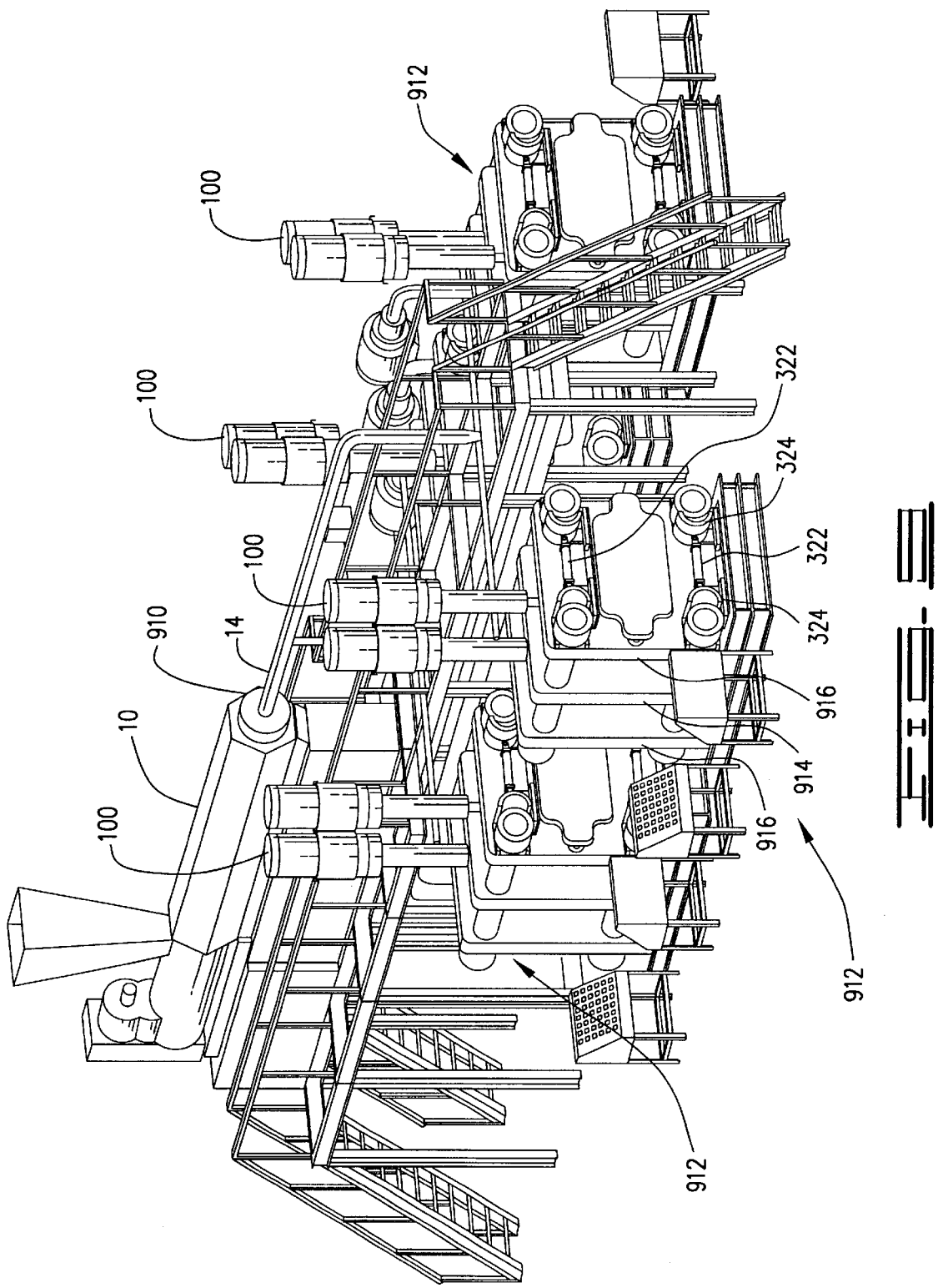

FIG. 8 is a flow pictorial diagram of the hydraulic system for the instant invention which allows operation of multiple mold work stations from a single pump. In this manner, a hydraulic reservoir is fluidly coupled to a circulating pump 402 which pressurizes hydraulic oil maintained at a high operating pressure by use of a hydraulic accumulator 404. The hydraulic accumulator 404 is capable of storing the pressurized oil and allowing for an immediate disbursement as necessary. The hydraulic fluid is then available to operate the hydraulic system in the module namely the extruder machine, the injector units 100 including the operating solenoid valves 128, the piston actuators 131 for engagement of the wear plate, as depicted by number 300 , the piston cylinders as depicted by numeral 340, and the ejectors as depicted by numeral 232. Hydraulic volume is returned at low pressure to return pipe 406 back to reservoir 400.

Referring now to FIG. 9, a pictorial view of a particular embodiment of a continuous extrusion, multiple mold station, injection molding system is shown. A central extrusion machine 10 provides a source of molten plastic. The extrusion rate (lbs/hr.) and speed of the extruder screw (rpm's) necessary to maintain the molten plastic at a specified pressure is determined by pressure transducer 910, through which the molten plastic passes as it travels from the extrusion machine 10 to the heated manifold 14 wherein it fills the accumulator/injection units 100, for pressure multiplication and ultimate filling of the high pressure injection molding stations, herein illustrated as double clamp molding stations 912. These molding stations utilize one common stationary central plate 914 for two independent and distinct movable plates 916 to define two separate molding stations which comprise the double clamp molding station 912. In operation, each of the movable plates 916, can be retracted for extraction of finished parts from the molds, then the movable plates can be independently slid back into locking engagement and the wedge shaped securement devices 324 are forced into locking engagement via actuators 322, so as to positively position the mold halves for the next injection of high pressure molten plastic.

It is to be understood that while we have illustrated and described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A high pressure injection molding system comprising: a manifold constructed and arranged for distributing a volume of softened plastic from a single remotely positioned plastic extruder; at least one molding workstation including a split mold and an injector means having an inlet and an outlet, said injector means inlet being fluidly coupled to said manifold means and said injector means outlet being fluidly coupled to said split mold; a check valve means positioned adjacent to said injector means to prevent backflow of softened plastic, said injector means being in fluid communication a resin accumulator including a pressure multiplier for increasing said volume of softened plastic to a higher pressure for transfer to said split mold at said higher pressure; said split mold characterized as having a first movable half and a second stationary half, and being constructed and arranged for receipt of said volume of softened plastic when fixed in a locked position within said molding workstation, each of said split mold halves being respectively coupled to at least one adjacent movable plate and an adjacent stationary plate, which plates are mechanically linked by a plurality of cylindrical tiebars, such that said stationary plate is mechanically coupled to said tiebars proximal end and said at least one movable plate is in slidable engagement with said tiebars; means for locking said split mold characterized by a plurality of slidable wedge shaped securement devices, each wedge shaped securement device positioned for spatial locking about a tiebar when forced between reciprocally angled wear plates located on the rear side surface of each moving plate and the distal end of said tiebars, thereby providing final lockup of said split mold; and a single remotely positioned hydraulic pumping station for providing an operating pressure for transfer of plastic, positioning of said split mold halves, and operation of said slidable wedge shaped securement devices;
whereby final lockup of said split mold halves results in application of compressive forces effective to maintain said split mold halves in nominal position during high pressure injection molding conditions.

2. The high pressure injection molding system according to claim 1, further including a plurality of mold workstations, and wherein said manifold means includes a distribution hub with heated coupling lines for directing a volume of softened plastic delivered through said extruder to said workstations.

3. The high pressure injection molding system according to claim 1 wherein said pressure multiplier is further defined as a plastic engaging piston of a first diameter placed within a first pre-sized chamber having one end secured to a hydraulically driven cylinder head of a second diameter and a second end available for engaging plastic, said cylinder head placed within a second pre-sized chamber wherein pressurized hydraulic fluid placed against said cylinder head creates an increased pressure to said piston whereby plastic placed within said chamber is injected at a pressure at least two times the pressurized hydraulic fluid.

4. The high pressure injection molding system according to claim 3 wherein said piston diameter is approximately 6 inches and a said cylinder head diameter is approximately 10 inches.

5. The high pressure injection molding system according to claim 1 wherein each said slidable wedge shaped securement devices have a chamfered edge operatively associated with said wear plates.

6. The high pressure injection molding system according to claim 1 wherein each of said tiebar shafts is threaded wherein the compressive force generated upon the mold halves upon final lockup is adjustable by rotation of a securement nut coupled to the end of each said tiebar shaft.

7. The high pressure injection molding system according to claim 1 including a replaceable angle wear washer operatively associated with each said slidable wedge shaped securement devices.

8. The high pressure injection molding system according to claim 1 wherein each of said slidable wedge shaped securement devices are constructed and arranged so as to partially encircle each of said tiebars when in the final lockup position, so as to provide over-center positioning of the wedge shaped securement device with respect to the longitudinal axis of the tiebar.

* * * * *